United States Patent [19]

Busse

[11] Patent Number: 4,491,638

[45] Date of Patent: * Jan. 1, 1985

[54] CONTROLLED ADDITION OF PROMOTERS TO ETHYLENE OXIDE CATALYSTS (11)

[75] Inventor: Paul J. Busse, Omaha, Nebr.

[73] Assignee: InterNorth, Inc., Omaha, Nebr.

[ * ] Notice: The portion of the term of this patent subsequent to Sep. 27, 1983 has been disclaimed.

[21] Appl. No.: 527,858

[22] Filed: Aug. 30, 1983

Related U.S. Application Data

[63] Continuation-in-part of Ser. No. 364,985, Apr. 2, 1982, Pat. No. 4,406,820.

[51] Int. Cl.$^3$ ............................................. B01J 31/04
[52] U.S. Cl. .................................... 502/167; 502/170
[58] Field of Search ................ 252/430, 476; 502/167, 502/170

[56] References Cited

U.S. PATENT DOCUMENTS 4,406,820  9/1983  Busse .................................... 502/167

Primary Examiner—Patrick Garvin
Attorney, Agent, or Firm—Donald F. Haas

[57] ABSTRACT

An improved method is disclosed for improving the selectivity of supported silver catalysts by incorporating a promoter therein. The improvement comprises forming a solution of a compound of the promoter and an anion which is not a catalyst poison and is selected from the group consisting of unsaturated carboxylic acids, aminoorganic acids, and hydroxybenzoic acids in a solvent and contacting the catalyst with the solution.

2 Claims, No Drawings

CONTROLLED ADDITION OF PROMOTERS TO ETHYLENE OXIDE CATALYSTS (11)

REFERENCE TO PRIOR APPLICATION

This application is a continuation-in-part of my prior application of the same title which was assigned U.S. Ser. No. 364,985 and was filed on Apr. 2, 1982. This application is now Pat. No. 4,406,820.

BACKGROUND OF THE INVENTION

This invention relates to a method for improving the selectivity of supported silver catalysts for the production of ethylene oxide. Specifically, the invention relates to an improvement in the known process for incorporating promoters into such catalysts.

Supported silver-based catalysts have been industrially for many years for the oxidation of ethylene to ethylene oxide with oxygen or air. Most of the ethylene which is reacted is converted into ethylene oxide on the silver-impregnated catalyst support material and the remainder of the ethylene is converted almost exclusively to carbon dioxide and water. The goal is to react as much ethylene as possible, i.e., high productivity, such that the greater amount of the ethylene is converted to ethylene oxide, i.e., high selectivity.

It is well known in the art that the incorporation of promoters, such a rubidium or cesium, into these catalysts will increase the selectivity thereof. U.S. Pat. No. 4,012,425, issued Mar. 15, 1977, discloses one such process which comprises treating the catalyst with a solution of cesium or rubidium. There are many similar disclosures in the art, both for the manufacture of new catalyst and for the regeneration of spent catalyst. However, nowhere in the prior art is there any disclosure that any particular anion should be used with the promoters, other than that the anion should not be a catalyst poison such as sulfur-containing compounds. The above patent states that no unusual effectiveness is observed with the use of any particular anion and goes on to say that nitrates, nitrites, chlorides, iodides, bromates, bicarbonates, oxalates, acetates, tartrates, lactates, and isopropoxides may be used.

SUMMARY OF THE INVENTION

The present invention relates to an improvement in the known method for improving the selectivity of supported silver catalysts by incorporating a promoter therein. The improvement comprises forming a solution of a compound of the promoter and an anion which is not a catalyst poison and is selected from the group consisting of unsaturated carboxylic acids, aminoorganic acids, and hydroxybenzoic acids in the solvent and then contacting the catalyst with the solution. The solution is drained from the catalyst and the catalyst is dried.

DETAILED DESCRIPTION OF THE INVENTION

The addition of promoters to silver-based ethylene oxide catalysts is an established part of the art catalyst manufacture. Promoters have been added to both new and used catalysts to provide increased selectivity and activity. A large array of anions have been listed as suitable for use with promoters. The chief restriction on the anion is the lack of harmful effect on catalyst performance.

It has been found that certain promoter-anion combinations are superior to those routinely employed in catalyst manufacture or regeneration today. The anion employed must have three general characteristics: (1) formation of a compound with a promoter which is soluble in a suitable solvent, (2) it must have one or more functional groups which have an affinity for the promoter ion and one or more groups which have an affinity for the silver surface of the catalyst, and (3) it must not contain a catalyst poison or act as a catalyst poison. The solubility of the promoter-anion combination is not restricted to water or aqueous systems, but encompasses all non-aqueous solvents that of themselves or in combination are not deleterious to catalyst performance. Suitable solvents are methanol, water, aliphatic, alicyclic, or aromatic ethers, alcohols, hydrocarbons, and ketones, and aliphatic or aromatic esters, amines, amides, aldehydes, and nitriles.

The polyfunctionality of the anion provides for site specific application of the promoter, optimum promoter utilization, and superior catalyst performance. The method provides a more homogeneous application of the promoter to the catalyst and minimizes the macro and microscopic concentration variations which adversely effect catalyst performance. The homogeneity is provided by the affinity of the functional groups for the silver surface of the catalyst. For the purpose of this invention, the anion preferably should not be solely of a chelating type in which all of the functional groups are tied up by the promoter cation. One or more of the functional groups should remain relatively free for complexation with the silver surface.

The anions which provide the above advantages and which are claimed herein are those derived fromm unsaturated carboxylic acids, aminoorganic acids, and hydroxybenzoic acids. Examples of suitable unsaturated carboxylic acids are acrylic acid, vinylacetic acid, and 5-hexenoic acid. Examples of suitable aminoorganic acids are m-aminobenzoic acid, p-aminobenzoic acid, alpha-aminobutyric acid, 6-aminocaproic acid, o-aminophenol, m-aminophenol, p-aminophenol, 2-amino-p-cresol, 4-amino-o-cresol, aminomethanesulfonic acid, aniline-2-sulfonic acid, 2,5-diaminobenzenesulfonic acid, 3-pyridylhydroxymethanesulfonic acid, m-aminiphenylboronic acid, and 4-aminophenylphosphonic acid. Examples of the hydroxybenzoic acids are m-hydroxybenzoic acid and p-hydroxybenzoic acid.

The method by which the above advantages are achieved comprises forming a compound of the promoter ion which is to be incorporated into the catalyst and one of the above anions, forming a solution of said compound in a suitable solvent, and then contacting the catalyst with the solution. The concentration of promoter in this solution should be in the range of 1 to 10,000 parts per million. This method can be used in the production of new catalyst by simply applying the above solution at the end of the normal catalyst manufacturing process. The method can be used in the regeneration of used catalyst by merely contacting the used catalyst with the solution.

EXAMPLE I

A single sample of aged silver-based ethylene oxide catalyst was used in all of the following experiments. The sample was split into several 60-gram portions for identical treatment with cesium salts of the different anions. The treatment procedure consisted of contacting the catalyst sample with 70 milliliters of a 100 part per million cesium in methanol solution for two hours, draining, and then drying at 60° C. for 20 hours. The 100 parts per million cesium solution was prepared by mixing a 100 parts per million cesium hydroxide solution with an equivalent quantity of the acid according to the equation $$CsOH + HOA \rightarrow CsOA + H_2O$$

where OA represent the anion of the acid.

For this evaluation, acetate provided the base line for a monofunctional anion. The dried treated catalysts were evaluated by manufacturing ethylene oxide in a reactor at a temperature of 400°–500° F. at a flow rate of 200 milliliters per minute of inlet gas with a composition of 7 percent oxygen, 8 percent carbon dioxide, 18 percent ethylene, and nitrogen ballast with 1 part per million ethylene dichloride added as an inhibitor.

The results of these experiments, shown in the following table, prove that the catalysts which were treated with the polyfunctional anions were superior catalysts to the catalyst which was treated with the monofunctional acetate ion.

TABLE 1

| Acid | Anion | % Selectivity at 1.5% Δ EO* | Temp. °F. |
|---|---|---|---|
| Acetic | Acetate | 70.4 | 452 |
| Acrylic | Acrylate | 72.0 | 447 |
| m-Aminobenzoic | m-Aminobenzoate | 72.6 | 458 |
| p-Aminobenzoic | p-Aminobenzoate | 74.0 | 443 |
| gamma-Aminobutyric | gamma-Aminobutyrate | 72.5 | 439 |
| 6-Aminocaproic | 6-Aminocaproate | 70.8 | 480 |
| m-Hydroxybenzoic | m-Hydroxybenzoate | 71.9 | 451 |
| p-Hydroxybenzoic | p-Hydroxybenzoate | 72.8 | 476 |

*The term Selectivity at 1.5% Δ EO means the selectivity at a productivity of 1.5%.

EXAMPLE II

A different sample of an aged silver-based ethylene oxide catalyst was split into several 60-gram portions for identical treatment with cesium salts of different aminoorganic acid anions. The treatment procedure was the same as the procedure in Example I. As in Example I, acetate provided the base line for a monofunctional anion. The dried treated catalysts were evaluated according to the procedure of Example I except that the temperature range was from 350°–500° F.

TABLE 2

| Acid | % Selectivity at 1.5% Δ EO |
|---|---|
| Acetic acid | 72.3 |
| o-Aminophenol | 73.3 |
| m-Aminophenol | 73.1 |
| p-Aminophenol | 74.4 |
| 2-Amino-p-cresol | 72.8 |
| 4-Amino-o-cresol | 72.5 |
| Aminomethanesulfonic acid | 72.5 |
| Aniline-2-sulfonic acid | 73.0 |
| 2,5-Diaminobenzenesulfonic acid | 74.8 |
| m-Aminophenylboronic acid | 74.6 |
| 4-Aminophenylphosphonic acid | 73.2 |
| o-Arsanilic acid | 60.5 |
| p-Arsanilic acid | 52.9 |

The results of the experiments, shown in the above table, prove that the catalysts which were treated with the polyfunctional aminoorganic acid anions of the present invention were superior catalysts to the catalysts which were treated with the monofunctional acetate ion. The arsanilic samples were evaluated at 1% ΔEO. These samples acted as though they were poisoned and thus the arsanilic acid anions are not effective in the present invention.

I claim:

1. In a method for improving the selectivity of supported silver catalysts by incorporating a promoter therein, the improvement which comprises forming a solution of a compound of the promoter and an aminoorganic acid which is not a catalyst poison in a solvent and contacting said catalyst with said solution.

2. The method of claim 1 wherein the concentration of the promoter in the solution is from 1 to 10,000 parts per million.

UNITED STATES PATENT AND TRADEMARK OFFICE
CERTIFICATE OF CORRECTION

PATENT NO. : 4,491,638

DATED : January 1, 1985

INVENTOR(S) : Paul J. Busse

It is certified that error appears in the above—identified patent and that said Letters Patent is hereby corrected as shown below:

Title page, lefthand column, item [54], line 2, delete "11" and insert therefor--II--.

Title page, lefthand column, item [*], line 9, delete "1983" and insert therefor--2000--.

Column 1, line 3, delete "11" and insert therefor--II--.

Column 1, line 18, before "industrially" insert--used--.

Column 2, line 34, delete "fromm" and insert therefor--from--.

Column 2, line 44, delete "m-amini-" and insert therefor--m-amino---.

Signed and Sealed this

Twenty-third Day of April 1985

[SEAL]

Attest:

DONALD J. QUIGG

Attesting Officer     Acting Commissioner of Patents and Trademarks